(No Model.)
W. B. HOPKINS.
ELASTIC TREAD HORSESHOE.
No. 603,468. Patented May 3, 1898.
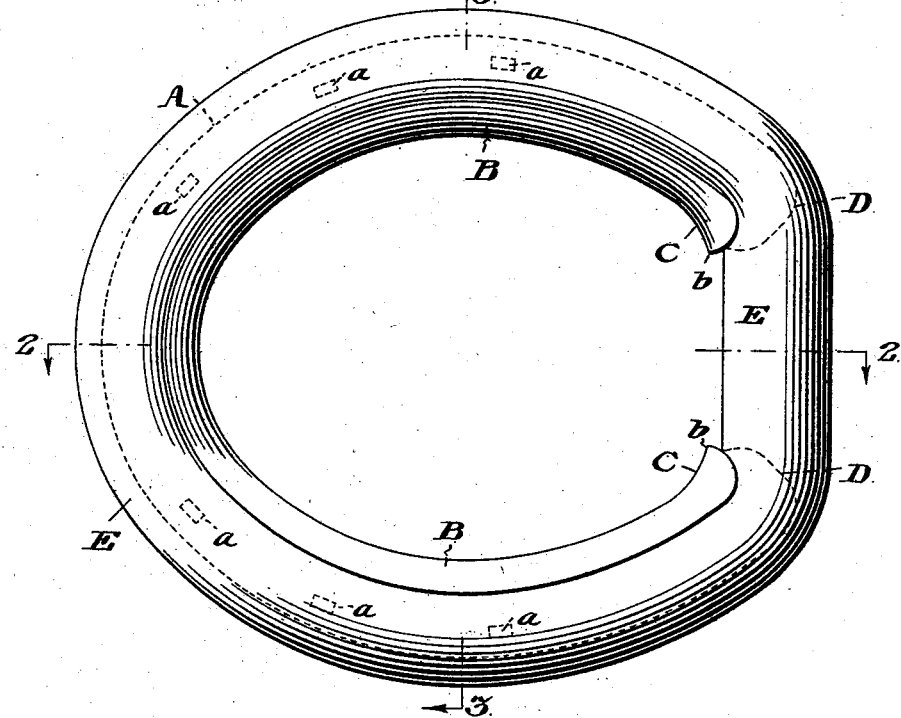
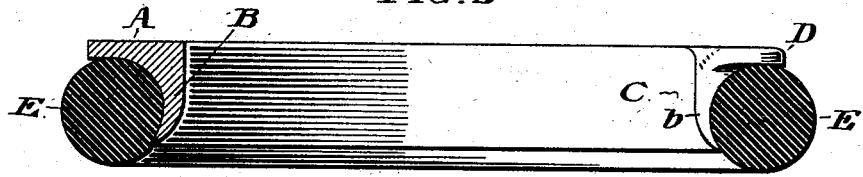
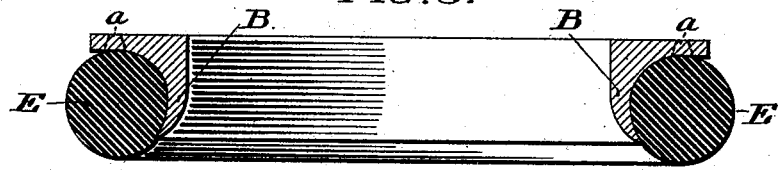
WITNESSES:
Arthur E. Paige
James H. Bell
INVENTOR:
W. B. Hopkins,
By Haley & Paul
Attorneys.

UNITED STATES PATENT OFFICE.

WILLIAM BARTON HOPKINS, OF PHILADELPHIA, PENNSYLVANIA.

ELASTIC-TREAD HORSESHOE.

SPECIFICATION forming part of Letters Patent No. 603,468, dated May 3, 1898.

Application filed January 17, 1898. Serial No. 666,847. (No model.)

*To all whom it may concern:*

Be it known that I, WILLIAM BARTON HOPKINS, of Philadelphia, in the State of Pennsylvania, have invented certain new and useful Improvements in Horseshoes, whereof the following is a specification, reference being had to the accompanying drawings.

In said drawings, Figure 1 represents a bottom plan view of a horseshoe embodying my invention. Fig. 2 is a section through the same on the plane of the line 2 2 of Fig. 1. Fig. 3 is a section at right angles to that of Fig. 2 on the line 3 3 of Fig. 1.

My invention relates to that type of horseshoe in which an elastic member forming the tread is combined with a metal base-plate adapted for attachment to the horse's hoof; and the object of my improvements is to provide a method of construction whereby the elastic member may be readily applied, so as to be renewable when worn without removing the base-plate from the hoof of the animal, the said member being, however, firmly retained in place during its life and being well adapted, both in form and position, to afford the desired elasticity.

Referring to the drawings, A indicates the base-plate, preferably of malleable iron or steel, somewhat thinner than an ordinary horseshoe, but having the general configuration thereof and provided with nail-holes $a$. (Shown in dotted lines.) Said base-plate is flat upon its upper face, or that which is in contact with the hoof, and is provided upon its lower face with a downwardly-projecting deep flange B of curved cross-section, as shown, which rises from and extends around the inner periphery of the base-plate. This flange forms a concave retaining-wall, whose curvature merges into the lower face of the base-plate. Said wall B is preferably made integral with the base-plate and follows the line of the inner periphery thereof until the points C C are reached, close to the respective extremities of the base-plate proper, from which points to the ends of the wall the curvature is turned more abruptly inward, so as to form a pair of oppositely-facing rounded lips $b$ $b$. The two extremities D D of the base-plate proper extend somewhat beyond these lips. A solid ring E of heavy vulcanized rubber constitutes the elastic member of the shoe. This ring is circular in cross-section and has a normal inner diameter considerably less than the diameter of the concave wall B, so that considerable force is required to spring it over said wall and into position. I have found that this can be practically accomplished by means of three-jawed distending-forceps; but obviously the result may be attained in any convenient manner.

When in position, the rubber ring has substantially the cross-section indicated in Figs. 2 and 3 and is firmly retained by its own elasticity in position within the cavity of the wall and on the lower surface of the base-plate, the only unsupported portion being that which intervenes between the extremities D D of said base-plate. The rounded lips $b$ $b$ of the wall have such configuration as not to present any sharp edge or corner which might indent the rubber injuriously at this point, and there is no tendency to cut or otherwise injure the ring at or near the points where the support ceases.

The gap between the lips $b$ $b$ may be as small as is consistent with affording the proper space for the "frog," thus minimizing the extent of the unsupported portion of the ring E.

In using the device the base-plate is first secured to the hoof, and the rubber ring is then sprung into position, as stated.

By the above construction a very durable and satisfactory cushioned shoe is provided possessing the highly important advantage that the rubber ring can be removed and a new one substituted without detaching the base-plate from the hoof or bending clips or other holding devices of similar character such as have heretofore been employed to secure the elastic member in shoes of this general class. The operation of removing and replacing the rubber ring can be very quickly performed and is in no way disturbing to the animal.

I am of course aware that the use of rubber as a cushion for horseshoes is not new and that it has been proposed to seat or embed such rubber cushions in a cavity or cavities formed in the base-plate of the shoe.

Hence I do not contemplate any construction of my claims hereinafter made which would include such prior devices; but

I claim—

1. The combination, with the base-plate, of a concave retaining-wall arranged around the inner periphery thereof; and a rubber ring having a normal diameter less than the diameter of said wall and adapted to be sprung into position over the latter and retained thereon by its own tension without the use of positive holding devices, substantially as described.

2. The combination, with the base-plate, of a concave retaining-wall arranged around the inner periphery thereof, said wall diverging inwardly at its extremities and terminating in rounded lips arranged with relation to one another, substantially as set forth; and a rubber ring having a normal diameter less than the diameter of said wall, and adapted to be sprung into position and retained thereon by its own tension without the use of positive holding devices, substantially as described.

W. BARTON HOPKINS.

Witnesses:
G. HERBERT JENKINS,
JAMES H. BELL.